(12) United States Patent
Earnshaw

(10) Patent No.: US 9,920,204 B2
(45) Date of Patent: Mar. 20, 2018

(54) METHODS FOR MAKING HYDROPHOBIZING COMPOSITIONS BY HYDRODYNAMIC CAVITATION AND USES THEREOF

(71) Applicant: Georgia-Pacific Wood Products LLC, Atlanta, GA (US)

(72) Inventor: Brian D Earnshaw, Ontario (CA)

(73) Assignee: Georgia-Pacific Wood Products LLC, Atlanta, GA (US)

( * ) Notice: Subject to any disclaimer, the term of this patent is extended or adjusted under 35 U.S.C. 154(b) by 174 days.

(21) Appl. No.: 14/325,412

(22) Filed: Jul. 8, 2014

(65) Prior Publication Data

US 2015/0013877 A1    Jan. 15, 2015

Related U.S. Application Data

(60) Provisional application No. 61/844,180, filed on Jul. 9, 2013.

(51) Int. Cl.
*B01F 3/08* (2006.01)
*B01F 11/02* (2006.01)
(Continued)

(52) U.S. Cl.
CPC ............ *C09D 5/022* (2013.01); *B01F 3/0811* (2013.01); *B01F 3/0819* (2013.01);
(Continued)

(58) Field of Classification Search
CPC .... B01F 3/0807; B01F 3/0811; B01F 3/0815; B01F 3/0819; B01F 11/0208; B27N 1/006; B27N 1/0209; B27N 3/02; B27N 3/04; B27N 3/08; B27N 3/002; C08L 91/06; C08L 91/08; C08L 97/005; C08L 97/02;
(Continued)

(56) References Cited

U.S. PATENT DOCUMENTS 4,407,999 A * 10/1983 Fushiki .................. C09J 161/00
524/276
4,610,913 A * 9/1986 Barnes ..................... B27N 3/04
156/62.2

(Continued)

OTHER PUBLICATIONS

ASTM D1037-06a, Standard Test Methods for Evaluating Properties of Wood-Base Fiber and Particle Panel Materials, ASTM International, West Conshohocken, PA, 2006.

*Primary Examiner* — Michael A Tolin
(74) *Attorney, Agent, or Firm* — Ram W. Sabnis

(57) ABSTRACT

Methods for making emulsified hydrophobizing compositions and uses thereof are provided. In at least one specific embodiment, a method for making an emulsified hydrophobizing composition, can include mixing a hydrophobizing agent, a liquid medium, and a lignosulfonic acid or salt thereof to provide a hydrophobizing composition and emulsifying the hydrophobizing composition using hydrodynamic cavitation to provide an emulsified hydrophobizing composition. The emulsified hydrophobizing composition can have an average particle size of about 0.3 microns to about 160 microns. The method can also include maintaining the emulsified hydrophobizing composition at a temperature of greater than a melting point of the hydrophobizing agent for at least 10 minutes.

20 Claims, 1 Drawing Sheet

(51) Int. Cl.

| | |
|---|---|
| *B27N 1/02* | (2006.01) |
| *C08L 91/06* | (2006.01) |
| *C08L 97/00* | (2006.01) |
| *C09D 191/06* | (2006.01) |
| *C09D 197/00* | (2006.01) |
| *C09D 5/02* | (2006.01) |
| *D21J 1/08* | (2006.01) |
| *C09D 191/08* | (2006.01) |
| *C08L 91/08* | (2006.01) |
| *B27N 3/00* | (2006.01) |
| *C09D 5/00* | (2006.01) |

(52) U.S. Cl.
CPC ........ *B01F 11/0208* (2013.01); *B27N 1/0209* (2013.01); *B27N 3/002* (2013.01); *C08L 91/06* (2013.01); *C08L 91/08* (2013.01); *C08L 97/005* (2013.01); *C09D 5/00* (2013.01); *C09D 191/06* (2013.01); *C09D 191/08* (2013.01); *C09D 197/005* (2013.01); *D21J 1/08* (2013.01)

(58) Field of Classification Search
CPC . C08L 2666/02; C08L 2666/26; C09D 5/022; C09D 191/06; C09D 191/08; C09D 197/005; C09D 197/02; C09L 91/00
See application file for complete search history.

(56) References Cited

U.S. PATENT DOCUMENTS

| | | | | |
|---|---|---|---|---|
| 4,832,858 | A * | 5/1989 | Vishnupad | A61K 8/06 508/110 |
| 6,132,885 | A * | 10/2000 | Peek | C08L 61/06 156/331.3 |
| 7,473,712 | B2 * | 1/2009 | Wantling | B01F 17/0092 106/162.1 |
| 7,842,731 | B2 * | 11/2010 | Eckert | B27N 1/00 516/41 |
| 2008/0187669 | A1 * | 8/2008 | Kingma | B27K 3/15 427/342 |
| 2010/0020631 | A1 * | 1/2010 | Gansmuller | B01F 5/0682 366/137.1 |

* cited by examiner

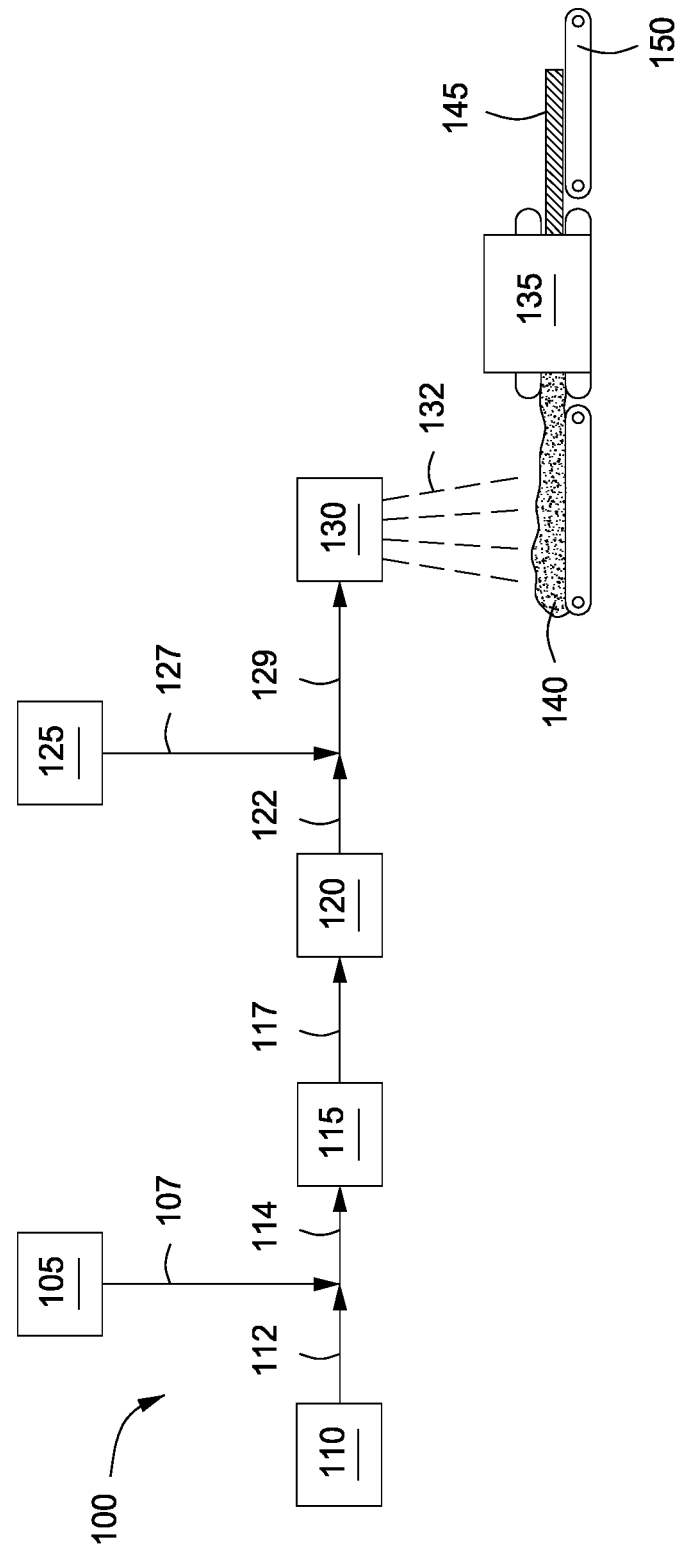

METHODS FOR MAKING HYDROPHOBIZING COMPOSITIONS BY HYDRODYNAMIC CAVITATION AND USES THEREOF

CROSS-REFERENCE TO RELATED APPLICATION

This application claims priority to U.S. Provisional Patent Application having Ser. No. 61/844,180, filed on Jul. 9, 2013, which is incorporated by reference herein in its entirety.

BACKGROUND

Field

Embodiments described herein generally relate to methods for making hydrophobizing compositions and uses thereof. More particularly, such embodiments relate to methods for making hydrophobizing emulsions by hydrodynamic cavitation for use in the manufacture of lignocellulosic composite products.

Description of the Related Art

Various types of engineered lignocellulose composites, such as flakeboard, waferboard, particleboard, and oriented strand board are known and used in construction applications. These composite products are prepared by applying adhesives to a plurality of lignocellulosic substrates, e.g., particles, strands, chips, or fibers, and forming them into the desired composite through the application of heat and pressure. Small amounts of hydrophobizing agents, commonly applied as an emulsion, are used to improve the moisture resistance of the lignocellulosic composites.

These hydrophobizing agent emulsions, however, have drawbacks. For example, hydrophobizing agent emulsions are often incompatible with the adhesive used to bind the lignocellulosic materials, which can cause de-emulsification and plugging of manufacturing lines. Furthermore, refrigeration or other cooling equipment is generally required to cool the hydrophobizing agent emulsion after formation to provide a stabilized emulsion.

There is a need, therefore, for improved hydrophobizing emulsion compositions and methods for making and using same.

SUMMARY

Methods for making emulsified hydrophobizing compositions and uses thereof are provided. In one or more embodiments, a method for making an emulsified hydrophobizing composition can include mixing a hydrophobizing agent, a liquid medium, and a lignosulfonic acid or salt thereof to provide a hydrophobizing composition and emulsifying the hydrophobizing composition using hydrodynamic cavitation to provide an emulsified hydrophobizing composition. The emulsified hydrophobizing composition can have an average particle size of about 0.3 microns to about 160 microns. The method can also include maintaining the emulsified hydrophobizing composition at a temperature of greater than a melting point of the hydrophobizing agent for at least 10 minutes.

In one or more embodiments, a method for making an emulsified hydrophobizing composition can include mixing a hydrophobizing agent, a liquid medium, and a lignosulfonic acid or salt thereof to provide a hydrophobizing composition and emulsifying the hydrophobizing composition using hydrodynamic cavitation to provide an emulsified hydrophobizing composition. The emulsified hydrophobizing composition can have an average particle size of about 0.3 microns to about 160 microns. The method can also include maintaining the emulsified hydrophobizing composition at a temperature of greater than 25° C. for at least 20 minutes.

In one or more embodiments, a method for making a composite product can include contacting a plurality of lignocellulosic substrates with a resin and an emulsified hydrophobizing composition to form a resinated wood mixture. The emulsified hydrophobizing composition can be made by mixing a hydrophobizing agent, a liquid medium, and a lignosulfonic acid or salt to provide a hydrophobizing composition and emulsifying the hydrophobizing composition using hydrodynamic cavitation. The emulsified hydrophobizing composition can have an average particle size of about 0.3 microns to about 160 microns. The temperature of the emulsified hydrophobizing composition can be maintained at greater than 25° C. for at least 20 minutes. The method can also include at least partially curing the resinated wood mixture to produce a composite product.

BRIEF DESCRIPTION OF THE DRAWINGS

The FIGURE depicts an illustrative system for emulsifying hydrophobizing compositions and applying the emulsified compositions to wood furnish in the production of lignocellulose composite products, according to one or more embodiments described.

DETAILED DESCRIPTION

It has been surprisingly and unexpectedly discovered that hydrodynamic cavitation can be used to form, make, or otherwise facilitate the preparation of emulsified hydrophobizing compositions that have an effective stability without having to reduce the temperature of the emulsion to below the melting point of the hydrophobizing agent as quickly as possible after the formation of the emulsion. It has also been discovered that making the emulsified hydrophobizing compositions via hydrodynamic cavitation produces lignocellulosic composite products having surprising and unexpected properties as compared to lignocellulosic composite products made with hydrophobizing emulsions made via processes other than hydrodynamic cavitation, e.g., shear homogenizers. As described in more detail below, components of the hydrophobizing composition can be or include, but are not limited to, one more hydrophobizing agents, one or more liquid media, and one or more lignosulfonic acids and/or salts thereof.

Hydrodynamic cavitation is the process of vaporization, bubble generation, and bubble implosion that occurs in a flowing liquid as a result of a decrease and subsequent increase in pressure. Hydrodynamic cavitation can occur if the pressure declines to some point below the saturated vapor pressure of the liquid. A cavitation apparatus can direct a liquid stream under pressure through an aperture into an enclosed chamber having a knife-like blade therein. The knife-like blade can be fixed at one end and unfixed at the other end. Kinetic energy can be transferred from the liquid stream to the unfixed end or "knife edge" causing it to vibrate in the audible and ultrasonic frequency spectrum, thus creating a cavitation effect or cavitation field of the liquid at the knife edge. Within this cavitation field, high energy mixing and emulsification can take place. The vibrating knife edge can provide agitation and cavitation to the liquid stream thereby bringing about the emulsification of the components of the hydrophobizing composition.

The emulsified hydrophobizing compositions can be dispersions of two or more immiscible liquids. The cavitation phenomena can disperse one or more of the liquids (dispersed phase) as small droplets in another liquid (continuous phase). The liquids, however, can contain particles such as one or more solidified hydrophobizing agents; hence, the emulsified hydrophobizing composition can have characteristics of suspensions and/or colloids.

The components of the hydrophobizing composition can be introduced to the cavitation apparatus in any desired manner. The components of the hydrophobizing composition can be prepared or combined with one another before the aperture which leads to the cavitation chamber. For example, a single feed in which a blend or mixture of all the components of the hydrophobizing composition can be introduced to the cavitation apparatus. In another example, a dual feed, a tri-feed, or other multi-feed introduction apparatus can be used to introduce the individual components of the hydrophobizing composition to the cavitation apparatus. As such, the liquid components of the hydrophobizing composition can be mixed prior to introduction to the cavitation apparatus and/or within the cavitation apparatus. In at least one specific embodiment, the components of the hydrophobizing composition can be brought into contact with one another prior to contacting the knife edge and prior to entering the aperture of the cavitation apparatus that focuses, guides, or otherwise directs the combined stream onto the knife edge.

The FIGURE depicts an illustrative system 100 for emulsifying hydrophobizing compositions and applying the emulsified compositions to wood furnish in the production of lignocellulose composite products, according to one or more embodiments. The system 100 can include one or more vessels, such as vessels 105, 110, 120, and 125, one or more hydrodynamic cavitation apparatus 115, one or more applicators 130, and one or more composite product forming units 135. The first vessel 105 can contain one or more hydrophobizing agents and/or liquid media. The second vessel 110 can contain one or more lignosulfonic acids and/or salts thereof and/or liquid media. The third vessel 120 can contain the emulsified hydrophobizing composition. The fourth vessel 125 can contain one or more resins.

One or more hydrophobizing agents and/or liquid mediums via line 112 and one or more lignosulfonic acids and/or salts thereof and/or liquid mediums via line 107 can be mixed, blended, or otherwise combined with one another to produce a mixture or "hydrophobizing composition" via line 114, as depicted in the FIGURE. The mixture via line 114 can be introduced to the hydrodynamic cavitation apparatus 115 for emulsification thereof to produce an emulsified hydrophobizing composition. The emulsified hydrophobizing composition via line 117 can be introduced to the third vessel 120. The third vessel 120 can store the emulsified hydrophobizing composition until desired for further use in making the composite products. Such storage of the emulsified hydrophobizing composition can provide process upsets and/or fluctuations in the rate of composite product production.

The emulsified hydrophobizing composition can be introduced to line 122 from the third vessel 120. One or more resins via line 127 can be transferred from the resin vessel 125 and mixed, blended, or otherwise combined with the emulsified hydrophobizing composition in line 122 to produce an emulsified hydrophobizing composition and resin mixture via line 129. The mixture via line 129 can be introduced to the applicator 130. The applicator 130 can spray, drip, brush, dump, pour, mist, coat, deposit, or otherwise direct the emulsified hydrophobizing composition and resin mixture 132 onto wood furnish to produce or make a resinated wood furnish 140. One or more composite product forming units 135 can form or shape the resinated wood furnish 140 to a desired dimension and at least partially cure the resin of the resinated furnish to produce a composite product 145. The composite product 145 can be recovered from the composite product forming unit 135 and transported, e.g., via conveyor 150, for further processing, storage, or the like.

One particular cavitation apparatus for producing hydrodynamic cavitation is a SONOLATOR®, which is manufactured by Sonic Corporation of Stratford, Conn., U.S.A. Cavitation apparatuses and methods for producing emulsions via hydrodynamic cavitation are discussed and described in U.S. Pat. Nos. 3,176,964; 3,399,031; 3,926,413; 4,675,194; 5,026,167; 5,492,654; 5,810,052; 5,837,272; 5,931,771; 5,937,906; 5,969,207; 5,971,601; 6,365,555; 6,502,979; 6,802,639; 6,857,774; 7,041,144; 7,178,975; 7,207,712; 7,247,244; 7,314,516; and 7,338,551. The cavitation apparatus 115 can be free of one or more rotating bodies or members, such as baffles, impellers, blades, shears, disks, paddles, stirrers, or the like. For example, the cavitation apparatus 115 can be free from any rotating member as found in shear homogenizers.

The hydrophobizing composition can be forced under pressure through an aperture at a high velocity (e.g., about 300 feet per second or more) into the cavitation chamber and directed toward the knife edge of the knife-like blade. Between the aperture and the knife edge, vortices can be created in the hydrophobizing composition perpendicular to the original flow vector. A stable pattern of vortices can be formed such that oscillations in the ultrasonic frequencies of about 20,000 hertz to about 100,000 hertz or greater can occur within the hydrophobizing composition. The frequency can be at least partially determined by viscosity, flow rate, aperture area, or any combination thereof. The forces within the liquid can cause the fluid to cavitate. The cavitation combined with the shear and turbulence within the cavitation chamber can emulsify the hydrophobizing composition.

In order to maintain a desired frequency of oscillation of the knife edge, the hydrophobizing composition can be moving through the feeds under an appropriate pressure. This pressure can at least be partially dependent upon the viscosity of the hydrophobizing composition, flow rate of the hydrophobizing composition, area of the aperture, or any combination thereof. The hydrophobizing composition can move through the feeds at or otherwise have a pressure of about 2,000 kPa, about 3,500 kPa, or about 7,000 kPa to about 28,000 kPa, about 30,000 kPa, or about 35,000 kPa. For example, the liquid components for the hydrophobizing composition can have a pressure of about 2,068 kPa to about 3,500 kPa, about 2,760 kPa to about 4,826 kPa, about 4,500 kPa to about 8,273 kPa, about 7,250 kPa to about 11,250 kPa, about 10,350 kPa to about 13,800 kPa, about 13,100 kPa to about 17,230 kPa, about 17,100 kPa to about 27,580 kPa, about 20,680 kPa to about 29,000 kPa, or about 26,200 kPa to about 35,000 kPa.

After passing through the cavitation apparatus, the emulsified hydrophobizing composition can exit via line 117 to the third vessel 120 or the emulsified hydrophobizing composition can be directed to the applicator 130 for application to the lignocellulose substrates. The emulsified hydrophobizing composition can be maintained at a temperature of at least 25° C. for greater than 10 minutes, at least 20 minutes, at least 30 minutes, at least 45 minutes, at least 60 minutes, or at least 120 minutes after emulsification. In other examples, the emulsified hydrophobizing composition can be maintained at a temperature of greater than 25° C., greater than 35° C., greater than 45° C., greater than 50° C., greater than 55° C., greater than 60° C., greater than 65° C., greater than 70° C., greater than 75° C., greater than 80° C., greater than 85° C., greater than 90° C., or greater than 95° C. from the time the emulsion is prepared or formed for a time period of greater than 10 minutes, greater than 20 minutes, greater than 30 minutes, greater than 45 minutes, greater than 60 minutes, or greater than 120 minutes. For example, the emulsified hydrophobizing composition can be maintained at a temperature of greater than 60° C. for at least 10 minutes to about 20 minutes, at least 10 minutes to about 30 minutes, about 20 minutes to about 40 minutes, about 30 minutes to about 60 minutes, or about 45 minutes to about 120 minutes after the emulsion is formed. In another example, the emulsified hydrophobizing composition can be maintained at a temperature of at least 50° C., at least 60° C., at least 65° C., at least 70° C., at least 75° C., at least 80° C., at least 85° C., at least 90° C., or at least 95° C. for at least 10 minutes, at least 20 minutes, at least 30 minutes, at least 45 minutes, at least 60 minutes, or at least 120 minutes. In another example, the emulsified hydrophobizing composition can be maintained at a temperature of about 50° C. to about 100° C., about 60° C. to about 100° C., about 65° C. to about 95° C., about 70° C. to about 95° C., about 75° C. to about 95° C., about 80° C. to about 95° C., about 85° C. to about 95° C., about 90° C. to about 95° C., about 70° C. to about 100° C., about 80° C. to about 100° C., about 90° C. to about 100° C., or about 95° C. to about 100° C. for at least 10 minutes to about 20 minutes, at least 10 minutes to about 40 minutes, about 20 minutes to about 60 minutes, about 30 minutes to about 90 minutes, or about 45 minutes to about 120 minutes. In another example, the emulsified hydrophobizing composition can be maintained at a temperature of about 60° C. to about 95° C., at least 60° C. to about 99° C., or at least 60° C. to less than 95° C. In another example, the emulsified hydrophobizing composition can be maintained at a temperature of about 65° C. to about 95° C., at least 65° C. to about 99° C., or at least 65° C. to less than 95° C. In another example, the emulsified hydrophobizing composition can be maintained at a temperature of about 70° C. to about 95° C., at least 70° C. to about 99° C., or at least 70° C. to less than 95° C. In another example, the emulsified hydrophobizing composition can be maintained at a temperature of about 75° C. to about 95° C., at least 75° C. to about 99° C., or at least 75° C. to less than 95° C. In another example, the emulsified hydrophobizing composition can be maintained at a temperature of about 80° C. to about 95° C., at least 80° C. to about 99° C., or at least 80° C. to less than 95° C. The emulsified hydrophobizing composition can be maintained at the elevated temperature, e.g., about 60° C. to about 99° C., for at least 10 minutes, at least 15 minutes, or at least 20 minutes to about 40 minutes, about 60 minutes, about 90 minutes, or about 120 minutes.

The emulsified hydrophobizing composition can be maintained at a temperature of greater than the melting point or melting range of the hydrophobizing agent in the emulsion for at least 10 minutes, at least 20 minutes, at least 30 minutes, at least 45 minutes, at least 60 minutes, or at least 120 minutes. For example, the emulsified hydrophobizing composition can be maintained at a temperature above or greater than the melting point or melting range of the hydrophobizing agent for about 10 minutes to about 20 minutes, about 10 minutes to about 30 minutes, about 20 minutes to about 40 minutes, about 30 minutes to about 60 minutes, or about 45 minutes to about 120 minutes after formation of the emulsified hydrophobizing composition.

The emulsion of the hydrophobizing composition can have larger and smaller particles of the dispersed phase coexisting throughout the continuous phase. The size distribution of these suspended particles can impart physical characteristics to the emulsion, such as stability, viscosity, lubricity, or any combination thereof. For example, the smaller the average particle size and the tighter the size distribution, the more stable the emulsion. Due to the pattern of the extreme shearing forces in the cavitation apparatus, the emulsified hydrophobizing composition can have a tighter particle size distribution than an emulsion made using other techniques or devices, such as shear homogenizers. The particle size distribution for the emulsified hydrophobizing composition can include a multiple series of individual and often overlapping particle size populations. For example, the particle size populations can fit a log-normal distribution with an average of less than 50 microns, less than 40 microns, less than 30 microns, less than 20 microns, less than 15 microns, less than 10 microns, or less than 5 microns. In another example, the particles in the emulsion having a particle size of less than 15 microns can be at least 50 wt %, at least 60 wt %, at least 70 wt %, at least 80 wt %, or at least 90 wt % of the combined weight of all suspended particles in the emulsified hydrophobizing composition. In yet another example, the particles in the emulsion having a particle size of less than 6 microns can be at least 50 wt %, at least 60 wt %, at least 70 wt %, at least 80 wt %, or at least 90 wt % of the combined weight of all suspended particles in the emulsified hydrophobizing composition. In yet another example, the particles in the emulsion having an particle size of about 0.6 microns, about 1 micron, or about 5 microns to about 50 microns, about 75 microns, or about 120 microns can be at least 50 wt %, at least 60 wt %, at least 70 wt %, at least 80 wt %, or at least 90 wt % of the combined weight of all suspended particles in the emulsified hydrophobizing composition. The particle sizes can be measured on a particle size distribution analyzer, such as, for example, a laser diffraction particle size distribution analyzer, commercially available as the LA-300 analyzer from Horiba Scientific, LTD. The particle sizes can be measured on the particle size distribution analyzer by following ISO-13320.

The hydrophobizing composition can have an average particle size of about 0.05 microns, about 0.1 micron, about 0.6 microns, about 1 micron, about 5 microns, about 7 microns, or about 10 microns to about 15 microns, about 25 microns, about 50 microns, about 75 microns, or about 120 microns. In another example, the hydrophobizing composition can have an average particle size of about 0.3 microns to about 160 microns, about 0.2 microns to about 0.7 microns, about 0.3 microns to about 0.7 microns, about 0.3 microns to about 2 microns, about 6 microns to about 25 microns, about 20 microns to about 40 microns, about 15 microns to about 55 microns, about 22 microns to about 48 microns, about 35 microns to about 60 microns, about 50 microns to about 75 microns or about 70 microns to about 120 microns. In another example, the hydrophobizing composition can have an average particle size of about 0.05 microns, about 0.1 micron, about 0.3 microns, about 0.5 microns, about 0.7 microns, about 1 micron, about 1.5 microns, about 2 microns, about 3 microns, about 5 microns, about 7 microns, about 10 microns, about 15 microns, about 20 microns, about 25 microns, about 30 microns about 40 microns, about 50 microns, or about 60 microns to about 80 microns, about 90 microns, about 100 microns, about 110 microns, about 120 microns, about 130 microns, about 140 microns, about 150 microns, or about 160 microns.

The hydrophobizing composition can include at least 0.5 wt % to about 30 wt % of the hydrophobizing agent, based on the combined weight of the lignosulfonic acid or salt thereof, the hydrophobizing agent, and the liquid medium. For example, the hydrophobizing composition can include the hydrophobizing agent in an amount of about 0.5 wt %, about 0.7 wt %, about 1 wt %, about 3 wt %, about 6 wt %, about 9 wt %, or about 12 wt % to about 15 wt %, about 20 wt %, about 23 wt %, or about 25 wt %, based on the combined weight of the lignosulfonic acid or salt thereof, the hydrophobizing agent, and the liquid medium. In another example, the hydrophobizing agent can be present in the hydrophobizing composition in an amount of about 0.6 wt % to about 3 wt %, about 1.3 wt % to about 5.5 wt %, about 5 wt % to about 8 wt %, about 1 wt % to about 10 wt %, about 7 wt % to about 12 wt %, about 9 wt % to about 16 wt %, about 14 wt % to about 17 wt %, about 15 wt % to about 18 wt %, about 19 wt % to about 25 wt %, or about 25 wt % to about 30 wt %, based on the combined weight of the lignosulfonic acid or salt thereof, the hydrophobizing agent, and the liquid medium.

In one or more embodiments, the hydrophobizing agent can include a single hydrophobizing agent. In one or more embodiments, the hydrophobizing agent can be or include two or more different hydrophobizing agents. If the hydrophobizing agent includes two different hydrophobizing agents, e.g., a first hydrophobizing agent and a second hydrophobizing agent, the first and second hydrophobizing agents can be present in any amount with respect to one another. For example, a weight ratio of the first hydrophobizing agent to the second hydrophobizing agent can be about 1:99, about 10:90, about 20:80, about 30:70, or about 40:60 to about 60:40, about 70:30, about 80:20, about 90:10, or about 99:1. In another example, if the hydrophobizing agent includes a first hydrophobizing agent and a second hydrophobizing agent, the mixture can have a hydrophobizing composition that includes the first hydrophobizing agent in an amount of about 1 wt % to about 99 wt % and conversely about 99 wt % to about 1 wt % of the second hydrophobizing agent, based on the combined weight of the first and second hydrophobizing agents. In another example, the amount of the first hydrophobizing agent can be about 5 wt %, about 10 wt %, about 15 wt %, about 20 wt %, about 25 wt %, about 30 wt %, about 35 wt %, about 40 wt %, or about 45 wt % to about 60 wt %, about 65 wt %, about 70 wt %, about 75 wt %, about 80 wt %, about 85 wt %, about 90 wt %, or about 95 wt %, based on the combined weight of the first and second hydrophobizing agents. In another example, if three or more hydrophobizing agents are present, then the three or more hydrophobizing agents can be present in any ratio with respect to one another.

If two or more hydrophobizing agents are present, the two or more hydrophobizing agents can be combined with one another as a solid, a liquid, or as a combination of a solid and a liquid. The hydrophobizing agent can be heated to a molten state and blended together (if blending is desired). If solid, the hydrophobizing agent can be heated to its melting point and introduced into the holding vessel or heated within the holding vessel to provide the hydrophobizing agent in liquid form. The mixture of hydrophobizing agents can be agitated to achieve a homogeneous product. Mixing blades, impellers, magnetic stir bars, shear agitation, or other mechanical devices can be used to mix the hydrophobizing agents. In another example, in-line mixing through a mixing tube can also be used to achieve the final product. In another example, ultrasonic sound waves can be used to mix, blend, or otherwise combine the hydrophobizing agents.

The one or more lignosulfonic acids or salts thereof in the hydrophobizing composition can help, improve, provide, or otherwise facilitate stability for the preparation of the emulsified hydrophobizing composition while providing surface activity for effective deposition of the one or more hydrophobizing agents onto the surface of lignocellulose substrates of the composite products. The stabilizer for the mixture can be or include one or more lignosulfonic acids and/or one or more salts (lignosulfonates) thereof. The lignosulfonic acid or salt thereof can be present in the hydrophobizing composition in an amount of about 0.1 wt %, about 2 wt %, or about 5 wt % to about 9 wt %, about 12 wt %, or about 15 wt %, based on the combined weight of the lignosulfonic acid or salt thereof, the hydrophobizing agent, and the liquid medium. For example, the lignosulfonic acid or salt thereof can be present in the hydrophobizing composition in an amount of about 0.1 wt % to about 1 wt %, about 0.5 wt % to about 2.5 wt %, about 1 wt % to about 4 wt %, about 2 wt % to about 5 wt %, about 3 wt % to about 6 wt %, about 3 wt % to about 9 wt %, about 4 wt % to about 10 wt %, about 6 wt % to about 12 wt %, or about 12 wt % to about 15 wt %, based on the combined weight of the lignosulfonic acid or salt thereof, the hydrophobizing agent, and the liquid medium.

The hydrophobizing composition can have a liquid medium content of about 18 wt %, about 20 wt %, or about 25 wt % to about 35 wt %, about 40 wt %, or about 59 wt %, based on the combined weight of the lignosulfonic acid or salt thereof, the hydrophobizing agent, and the liquid medium. For example, the hydrophobizing composition can have a liquid medium content or water concentration of about 59 wt % or less, about 57 wt % or less, about 55 wt % or less, about 53 wt % or less, about 50 wt % or less, about 47 wt % or less, about 45 wt % or less, about 43 wt % or less, about 40 wt % or less, about 37 wt % or less, about 35 wt % or less, about 33 wt % or less, about 30 wt % or less, about 27 wt % or less, or about 25 wt % or less, based on the combined weight of the lignosulfonic acid or salt thereof, the hydrophobizing agent, and the liquid medium. In other example, the hydrophobizing composition can have a liquid medium content of about 15 wt % to about 25 wt %, about 20 wt % to about 30 wt %, about 20 wt % to about 59 wt %, about 25 wt % to about 35 wt %, about 27 wt % to about 40 wt %, about 33 wt % to about 43 wt %, about 37 wt % to about 49 wt %, about 45 wt % to about 56 wt %, or about 45 wt % to about 59 wt %, based on the combined weight of the lignosulfonic acid or salt thereof, the hydrophobizing agent, and the liquid medium.

The viscosity of the hydrophobizing composition can vary widely. For example, the viscosity of the mixture of the hydrophobizing agent and the lignosulfonic acid or salt thereof can be about 10 centipoise ("cP"), about 500 cP, about 1,000 cP, or about 5,000 cP to about 10,000 cP, about 15,000 cP, about 20,000 cP, or about 30,000 cP at a temperature of about 25° C. For example, the hydrophobizing composition can have a viscosity of about 10 cP to about 1,000 cP, about 1,000 cP to about 7,500 cP, about 5,000 cP to about 12,000 cP, about 10,000 cP to about 17,000 cP, about 16,000 cP to about 22,000 cP, about 20,000 cP to about 25,000 cP, about 22,000 cP to about 27,000 cP, or about 20,000 cP to about 30,000 cP at a temperature of about 25° C. The viscosity of the hydrophobizing composition and other compositions discussed and described herein can be determined using a Brookfield viscometer at a temperature of about 25° C. For example, a Brookfield viscometer, Model DV-II+, with a small sample adapter (e.g., 10 mL adapter) and the appropriate spindle to maximize torque, for example, a number 31 spindle, can be used. The small sample adapter can allow the sample to be cooled or heated by the chamber jacket to maintain the temperature of the sample surrounding the spindle at a temperature of about 25° C.

The hydrophobizing composition can have a non-volatile material or "solids" content of about 20 wt %, about 40 wt %, about 50 wt %, or about 65 wt % to about 75 wt %, about 80 wt %, about 85 wt %, about 95 wt %, or about 99.9 wt %, based on the combined weight of the lignosulfonic acid or salt thereof, the hydrophobizing agent, and the liquid medium. In other example, the hydrophobizing composition can have a solids content of about 20 wt % to about 59 wt %, about 40 wt % to about 60 wt %, about 60 wt % to about 80 wt %, about 80 wt % to about 95 wt %, about 25 wt % to about 75 wt %, about 60 wt % to about 90 wt %, or about 75 wt % to about 85 wt %, based on the combined weight of the lignosulfonic acid or salt thereof, the hydrophobizing agent, and the liquid medium. In another example, hydrophobizing composition can have a solids content of at least 20 wt %, at least 23 wt %, at least 25 wt %, at least 27 wt %, at least 30 wt %, at least 33 wt %, at least 35 wt %, at least 37 wt %, at least 41 wt %, at least 45 wt %, at least 47 wt %, at least 50 wt %, at least 53 wt %, at least 55 wt %, at least 57 wt %, or at least 62 wt %, based on the combined weight of the lignosulfonic acid or salt thereof, the hydrophobizing agent, and the liquid medium. As used herein, solids content, as understood by those skilled in the art, can be measured by determining the weight loss upon heating a small sample, e.g., about 1 gram to about 5 grams of the mixture, to a suitable temperature, e.g., about 125° C., and a time sufficient to remove the liquid therefrom. By measuring the weight of the sample before and after heating, the percent solids in the sample can be directly calculated or otherwise estimated.

The one or more hydrophobizing agents can be or include one or more waxes, such as petroleum waxes, montan waxes, vegetable waxes, vegetable oils, or any mixture thereof. Illustrative petroleum waxes can include, but are not limited to, paraffin wax, microcrystalline wax, and slack wax. Petroleum waxes can be either in the form of varying levels of refined paraffins, or less refined slack wax, as part of the petroleum refining process. Paraffin wax can be or include mixtures of alkanes that can have about 20 carbon chains to about 40 carbon chains. The carbon chains of the paraffin wax can be linear or branched chains. Suitable paraffin waxes can have melting points or melting ranges at temperatures of about 40° C. to about 110° C. Slack wax can be produced by chilling and solvent filter-pressing wax distillate from the petroleum refining process. Slack wax can be semi-refined wax, distinguished from scale wax, which can have higher oil content. Suitable slack waxes can have melting points or melting ranges at temperatures of about 40° C. to about 110° C. Microcrystalline waxes can be wax produced by de-oiling petrolatum, as part of the petroleum refining process microcrystalline wax contains a higher percentage of branched alkanes and cycloalkanes. The microcrystalline wax can include of high molecular weight saturated aliphatic hydrocarbons and can be characterized by the fineness of its crystal structures in contrast to the larger crystal structures associated with paraffin waxes. Suitable microcrystalline waxes can have melting points or melting ranges at temperatures of about 40° C. to about 110° C.

Montan waxes can include long chain ($C_{24}$-$C_{30}$) carboxylic acid esters, long chain ($C_{24}$-$C_{30}$) carboxylic acids, long chain ($C_{24}$-$C_{30}$) alcohols, long chain ($C_{24}$-$C_{30}$) ketones, and long chain ($C_{24}$-$C_{30}$) alkanes, and the remaining resins. In some examples, montan wax can have about 62 wt % to about 68 wt % of the long chain carboxylic acid esters, about 22 wt % to about 26 wt % of the long chain carboxylic acids, about 7 wt % to about 15 wt % of the long chain alcohols, long chain ketones, and long chain alkanes, and the remainder of resins. The montan wax can have a melting point of about 82° C. to about 95° C. Montan wax can have limited solubility in water, but solvents such as carbon tetrachloride, benzene, chloroform, or other organic solvents, can be used to incorporate montan wax into the emulsion.

Illustrative vegetable wax can include, but is not limited to, carnauba wax, bayberry wax, candelilla wax, castor wax, esparto wax, jojoba wax, ouricury wax, rice bran wax, soy wax, or any combination or mixture thereof. Carnauba wax is a protective coating for leaves that can be harvested from *Copernica cerifera*, a Brazilian palm tree. Carnauba is a hard, brittle wax with a melting point of about 86° C.

The vegetable wax can be made from vegetable oils. After harvesting, the vegetable matter can be cleaned, cracked, de-hulled, and rolled into flakes. An oil can be then extracted from the flakes and hydrogenated. A hydrogenation process can be used to convert some or all of the fatty acids in the oil from unsaturated to saturated. The hydrogenation process can increase the melting point of the oil, therefore providing the oil a solid state versus a liquid state at room temperature (e.g., about 25° C.).

Illustrative vegetable oils that can be used as the fatty acids can include, but are not limited to, safflower oil, grapeseed oil, sunflower oil, walnut oil, soybean oil, cottonseed oil, coconut oil, corn oil, olive oil, palm oil, palm olein, peanut oil, rapeseed oil, canola oil, sesame oil, hazelnut oil, almond oil, beech nut oil, cashew oil, macadamia oil, mongongo nut oil, pecan oil, pine nut oil, pistachio oil, grapefruit seed oil, lemon oil, orange oil, watermelon seed oil, bitter gourd oil, buffalo gourd oil, butternut squash seed oil, egusi seed oil, pumpkin seed oil, borage seed oil, blackcurrant seed oil, evening primrose oil, acai oil, black seed oil, flaxseed oil, carob pod oil, amaranth oil, apricot oil, apple seed oil, argan oil, avocado oil, babassu oil, ben oil, borneo tallow nut oil, cape chestnut, algaroba oil, cocoa butter, cocklebur oil, poppyseed oil, cohune oil, coriander seed oil, date seed oil, dika oil, false flax oil, grape seed oil, hemp oil, kapok seed oil, kenaf seed oil, lallemantia oil, mafura oil, manila oil, meadowfoam seed oil, mustard oil, okra seed oil, papaya seed oil, perilla seed oil, persimmon seed oil, pequi oil, pili nut oil, pomegranate seed oil, prune kernel oil, quinoa oil, ramtil oil, rice bran oil, royle oil, shea nut oil, sacha inchi oil, sapote oil, seje oil, taramira oil, tea seed oil, thistle oil, tigernut oil, tobacco seed oil, tomato seed oil, wheat germ oil, castor oil, colza oil, flax oil, radish oil, rapeseed oil, salicornia oil, tung oil, honge oil, jatropha oil, jojoba oil, nahor oil, paradise oil, petroleum nut oil, dammar oil, linseed oil, stillingia oil, vernonia oil, amur cork tree fruit oil, artichoke oil, bladderpod oil, brucea javanica oil, burdock oil, candlenut oil, carrot seed oil, chaulmoogra oil, crambe oil, croton oil, cuphea oil, honesty oil, mango oil, neem oil, oojon oil, rose hip seed oil, rubber seed oil, sea buckthorn oil, sea rocket seed oil, snowball seed oil, tall oil, tamanu oil, tonka bean oil, ucuhuba seed oil, or any mixture thereof.

The lignosulfonic acid can be used as the acid, one or more salts thereof (e.g., lignosulfonates), or any mixture thereof. The lignosulfonic acid or salt thereof can function as a dispersant and/or stabilizer for the emulsion. The lignosulfonic acid or salt thereof can be derived from lignin. Lignin is a polymeric substance that can include substituted aromatics found in plant and vegetable matter associated with cellulose and other plant constituents. Illustrative plant and vegetable matter can include, but is not limited to, straw, hemp, sisal, cotton stalk, wheat, bamboo, sabai grass, rice straw, banana leaves, paper mulberry (e.g., bast fiber), abaca leaves, pineapple leaves, esparto grass leaves, fibers from the genus *Hesperaloe*, jute, salt water reeds, palm fronds, flax, flax seeds, ground nut shells, hardwoods, softwoods, recycled fiberboards (e.g., high density fiberboards, medium density fiberboards, low density fiberboards, oriented strand boards, or particleboards), or any combination thereof. For example, the plant matter can be or include wood, for example hardwoods, softwoods, or a combination thereof. Illustrative types of wood can include, but are not limited to, alder, ash, aspen, basswood, beech, birch, cedar, cherry, chinaberry, cottonwood, cypress, elm, fir, gum, hackberry, hickory, maple, mesquite, oak, pecan, pine, poplar, redwood, sassafras, spruce, sycamore, tallow, walnut, and willow. Suitable lignosulfonic acid salts can include, but are not limited to, ammonium lignosulfonate, alkyl ammonium lignosulfonate, hydroxyalkyl ammonium lignosulfonate, lithium lignosulfonate, sodium lignosulfonate, potassium lignosulfonate, calcium lignosulfonate, magnesium lignosulfonate, or any combination or mixture thereof. Exemplary sources of lignosulfonic acid, one or more lignosulfonates, or any mixture thereof include POLYFON® H, commercially available from MeadWestvaco Corporation, Charleston, S.C.

The liquid medium can include, but is not limited to, water, one or more alcohols, one or more ethers, or any mixture thereof. Suitable alcohols can include, but are not limited to, methanol, ethanol, propanol, iso-propanol, n-butanol, sec-butanol, iso-butanol, tert-butanol, ethylene glycol, or any mixture thereof. Suitable ethers can include, but are not limited to, dimethyl ether, diethyl ether, tetrahydrofuran, or any mixture thereof.

In one or more embodiments, the liquid medium can include a single liquid medium. In one or more embodiments, the liquid medium can be or include two or more different liquid media. If the liquid medium includes two different liquid media, e.g., a first liquid medium and a second liquid medium, the first and second liquid media can be present in any amount with respect to one another. For example, a weight ratio of the first liquid medium to the second liquid medium can be about 1:99, about 10:90, about 20:80, about 30:70, or about 40:60 to about 60:40, about 70:30, about 80:20, about 90:10, or about 99:1. In another example, if the liquid medium includes a first liquid medium and a second liquid medium, the mixture can have a liquid medium that includes the first liquid medium in an amount of about 1 wt % to about 99 wt % and conversely about 99 wt % to about 1 wt % of the second liquid medium, based on the combined weight of the first and second liquid media. In another example, the amount of the first liquid medium can be about 5 wt %, about 10 wt %, about 15 wt %, about 20 wt %, about 25 wt %, about 30 wt %, about 35 wt %, about 40 wt %, or about 45 wt % to about 60 wt %, about 65 wt %, about 70 wt %, about 75 wt %, about 80 wt %, about 85 wt %, about 90 wt %, or about 95 wt %, based on the combined weight of the first and second liquid media. In another example, if three or more liquid media are present, then the three or more liquid media can be present in any ratio with respect to one another.

One or more surfactants can be present in the hydrophobizing composition to aid in the emulsification. The surfactant can be present in the hydrophobizing composition in an amount of about 0.1 wt %, about 0.5 wt %, about 1 wt %, about 2 wt %, about 3 wt %, about 4 wt %, about 5 wt %, about 7 wt %, or about 10 wt % to about 18 wt %, about 22 wt %, or about 30 wt %, based on the combined weight of the lignosulfonic acid or salt thereof, the hydrophobizing agent, and the liquid medium. In another example, the surfactant can be present in the hydrophobizing composition in an amount of about 0.2 wt % to about 0.4 wt %, about 0.3 wt % to about 1.1 wt %, about 1 wt % to about 7 wt %, about 10 wt % to about 16 wt %, or about 20 wt % to about 25 wt %, based on the combined weight of the lignosulfonic acid or salt thereof, the hydrophobizing agent, and the liquid medium.

Suitable surfactants can include, but are not limited to, cationic surfactants, non-ionic surfactants, anionic surfactants, zwitterionic surfactants, amphoteric surfactants, starch-based surfactants, and soap-based surfactants. Illustrative cationic surfactants can include, but are not limited to, nitrogen-containing compounds such as quaternary ammonium compounds, salts of tertiary amines, water-soluble nitrogen-containing epichlorohydrin resins, cationic polyurethanes, polyamidoamines, polyamidoamine-epichlorohydrin (PAE) copolymers, dimethylamine-epichlorohydrin copolymers, dimethylamine-ethylenediamine-epichlorohydrin copolymers, ammonia-ethylenendichloride copolymers, homopolymers and copolymers of diallyldimethylammonium chloride, dialkylaminoalkyl acrylates, methacrylates and acrylamides (e.g., dimethylaminoethyl acrylates and methacrylates), cationic polymers (e.g., polyacrylamide, polyethyleneimine, polyamidoamine and poly (diallyldimethyl ammoniumchloride)), or any mixture thereof. Other illustrative cationic surfactants can include, but are not limited to, dioctyldimethylammonium chloride, didecyldimethylammonium chloride, dicocodimethylammonium chloride, cocobenzyldimethylammonium chloride, coco(fractionated)benzyldimethylammonium chloride, octadecyl trimethylammonium chloride, dioctadecyl dimethylammonium chloride, dihexadecyl dimethylammonium chloride, di(hydrogenated tallow)dimethylammonium chloride, di(hydrogenated tallow)benzylmethylammonium chloride, (hydrogenated tallow)benzyldimethylammonium chloride, dioleyldimethylammonium chloride, and di(ethylene hexadecanecarboxylate)dimethylammonium chloride, or any mixture thereof.

Illustrative anionic surfactants can include, but are not limited to, aliphatic secondary and tertiary amines in which the aliphatic substituents can be a straight chain or a branched chain, and where one of the aliphatic substituents can contain about 8 carbon atoms to about 18 carbon atoms, and one of the aliphatic substituents contains an anionic water solubilizing group, e.g., carboxyl, sulfonate, sulfate, phosphate, or phosphonate. Exemplary anionic surfactants can include sodium 3-dodecylaminopropionate, sodium 3-dodecylaminopropane sulfonate, N-alkyltaurines, such as the one prepared by reacting dodecylamine with sodium isethionate, according to the teaching of U.S. Pat. No. 2,658,072, N-higher alkyl aspartic acids, such as those produced according to the teaching of U.S. Pat. No. 2,438,091, and the products sold under the trade name MIRANOL® and described in U.S. Pat. No. 2,528,378. Other illustrative anionic surfactants can include, but are limited to, lithium, sodium, ammonium, potassium, or triethanolamine alkyl sulfates, especially those obtained by sulfating the higher alcohols (e.g., about $C_8$-$C_{18}$ carbon atoms), sodium coconut oil fatty acid monoglyceride sulfates and sulfonates; sodium or potassium salts of sulfuric acid esters of the reaction product of 1 mole of a higher fatty alcohol e.g., tallow or coconut oil alcohols) and 1 mole to about 12 moles of ethylene oxide; sodium or potassium salts of alkyl phenol ethylene oxide ether sulfate with 1 unit to about 10 units of ethylene oxide per molecule and in which the alkyl radicals contain about 8 carbon atoms to about 12 carbon atoms, sodium alkyl glyceryl ether sulfonates; the reaction product of fatty acids having about 10 carbon atoms to about 22 carbon atoms esterified with isethionic acid and neutralized with sodium hydroxide; water soluble salts of condensation products of fatty acids with sarcosine; and others known in the art. Other illustrative surfactants can include, but are not limited to, methyl acyl taurates, N-acyl glutamates, acyl isethionates, alkyl sulfosuccinates, alkyl phosphate esters, ethoxylated alkyl phosphate esters, trideceth sulfates, or any mixture thereof.

Illustrative non-ionic surfactants can include, but are not limited to, ethoxylated fatty alcohols, alkyl phenols, fatty acid amides, ethoxylated or non-ethoxylated glycerol esters, sorbitan esters of fatty acids, or any mixture thereof.

Illustrative zwitterionic surfactants can be exemplified by those which can be broadly described as derivatives of aliphatic quaternary ammonium, phosphonium, and sulfonium compounds, in which the aliphatic radicals can be straight chain or branched and where one of the aliphatic substituents contains about 8 carbon atoms to about 18 carbon atoms and one contains an anionic water-solubilizing group, e.g., carboxyl, sulfonate, sulfate, phosphate, or phosphonate. Representative examples of zwitterionic surfactants can include, but are not limited to, 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetradecylphosphonio]-2-hydroxypropane-1-phosphate; 3-[N,N-dipropyl-N-3-dodecoxy-2-hydroxypropylammonio]propane-1-phosphonate; 3-(N,N-dimethyl-N-hexadecylammonio)propane-1-sulfonate; 3-(N,N-dimethyl-N-hexadecylammonio)-2-hydroxypropane-1-sulfonate; 4-(N,N-di(2-hydroxyethyl)-N-(2-hydroxydodecyl)ammonio]-butane-1-carboxylate; 3-[S-ethyl-S-(3-dodecoxy-2-hydroxypropyesulfonio]-propane-1-phosphate; 3-[P,P-dimethyl-P-dodecylphosphonio]-propane-1-phosphonate; 5-[N,N-di(3-hydroxypropyl)-N-hexadecylammonio]-2-hydroxypentane-1-sulfate; or any mixture thereof.

Zwitterionic surfactants can also include betaines. Exemplary betaines can include alkyl betaines, such as coco dimethyl carboxymethyl betaine, 1-auryl dimethyl carboxymethyl betaine, lauryl dimethyl alpha-carboxyethyl betaine, cetyl dimethyl carboxymethyl betaine, lauryl bis-(2-hydroxyethyl)carboxymethyl betaine, stearyl bis-(2-hydroxypropyl)carboxymethyl betaine, oleyl dimethyl gamma-carboxypropyl betaine, lauryl bis-(2-hydroxypropyl)-alpha-carboxyethyl betaine, salts thereof, or any mixture thereof. The sulfobetaines can be represented by coco dimethyl sulfopropyl betaine, stearyl dimethyl sulfopropyl betaine, amido betaines, amidosulfobetaines, and the like.

Illustrative starch surfactants can include, but are not limited to, hydroxyethyl cellulose, hydroxypropyl cellulose, methylhydroxypropyl cellulose, ethylhydroxyethylcellulose, methyl cellulose, carboxymethyl cellulose, gelatin, starch, guar gum, xanthan gum, polyvinyl alcohol, or any mixture thereof. The starch surfactant can include nanostarches. Exemplary nanostarches are commercially available from Ecosynthetix, Inc. Derivatized starches can be obtained by reacting natural starches with cationizing agents, such as glycidyltrimethylammonium chloride or 3-chloro-2-hydroxypropyltrimethylammonium chloride. Suitable anionic surfactants can include, but are not limited to, phosphated, sulphonated, and carboxylated lignin or polysaccharides, anionic polyurethanes, naphthalene sulfonates, and vinyl addition polymers formed from monomers with anionic groups (e.g., acrylic acid, methacylic acid, maleic acid, itaconic acid, crotonic acid, vinylsulfonic acid, sulfonated styrene, phosphates of hydroxyalkyl acrylates, or methacrylates).

Illustrative soap-based surfactants can include long chain alkyl or alkenyl, branched or normal carboxylic acid salt, such as lithium, sodium, potassium, ammonium, or substituted ammonium salt, can be present in the composition. Exemplary long chain alkyl or alkenyl can have a length of about 8 carbon atoms to about 22 carbon atoms, or about 10 carbon atoms to about 20 carbon atoms, and can include normal and/or branching alkyl compounds. Small quantities of olefinic bond(s) may be present in the predominantly alkyl sections, particularly if the source of the "alkyl" group is obtained from a natural product such as tallow, coconut oil, or the like.

The hydrophobizing composition can include one or more additives. Illustrative additives can include, but are not limited to, dispersants, flame retardants, corrosion inhibitors, dyes, fungicides, insecticides, or any mixture thereof. The additive can be present in the mixture in an amount of about 0.1 wt %, about 5 wt %, about 7 wt %, or about 10 wt % to about 18 wt %, about 22 wt %, or about 30 wt %, based on the combined weight of the lignosulfonic acid or salt thereof, the hydrophobizing agent, the dispersant, and the liquid medium. In another example, the dispersant can be about 0.2 wt % to about 0.4 wt %, about 1 wt % to about 7 wt %, about 10 wt % to about 16 wt %, or about 20 wt % to about 25 wt %, based on the combined weight of the lignosulfonic acid or salt thereof, the hydrophobizing agent, and the liquid medium.

The hydrophobizing composition can also include one or more inorganic bases. Illustrative inorganic bases can be or include, but are not limited to, potassium hydroxide, sodium hydroxide, calcium hydroxide, magnesium hydroxide, or any mixture or combination thereof. The inorganic base can be present in the mixture in an amount of about 0.1 wt %, about 0.3 wt %, about 0.5 wt %, about 0.8 wt %, or about 1 wt % to about 4 wt %, about 5 wt %, or about 6 wt %, based on the combined weight of the lignosulfonic acid or salt thereof, the hydrophobizing agent, the inorganic base, and the liquid medium. In another example, the inorganic base can be about 0.2 wt % to about 0.4 wt %, about 0.5 wt % to about 0.7 wt %, about 1.0 wt % to about 1.6 wt %, about 2.4 wt % to about 4.0 wt %, or about 3.2 wt % to about 5.8 wt %, based on the combined weight of the lignosulfonic acid or salt thereof, the hydrophobizing agent, the inorganic base, and the liquid medium.

The pH of the hydrophobizing composition can be about 1, about 2, about 3, about 4, about 5, about 6, about 7 to about 8, about 9, about 10, about 11, about 12, or about 13. In another example, the pH of the hydrophobizing composition can have a pH of about 1 to about 2, about 2 to about 3, about 3 to about 4, about 4 to about 5, about 5 to about 6, about 6 to about 7, about 7 to about 8, about 8 to about 9, about 9 to about 10, about 10 to about 11, about 11 to about 12, or about 12 to about 13.

In one or more embodiments, a lignocellulose composite product can be made by contacting one or more lignocellulosic substrates with one or more resins and the hydrophobizing composition to produce a resinated wood mixture. The resinated wood mixture can be at least partially cured to produce the composite product. The resinated wood mixture can be cured via a number of methods, e.g., with the addition of one or more acids, bases, and/or catalysts, the application of heat and/or pressure, or any combination thereof, to produce the composite product.

The resinated wood mixture can be heated to at least partially cure the resin contained therein to produce the lignocellulose composite product or simply "composite product." As used herein, the terms "curing," "cured," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the mixture is subjected to conditions sufficient, e.g., sufficiently heated, to cause the properties of a flexible, porous substrate, such as a nonwoven mat or blanket of lignocellulose substrates and/or a rigid or semi-rigid substrate, such as wood or other lignocellulose containing board, to which an effective amount of the binder composition has been applied, to be altered.

The resinated wood mixture contacted to the lignocellulosic substrates are referred to herein as a coating, even though the resin, the hydrophobizing composition, and the liquid medium can be in the form of small particles, such as atomized particles or solid particles, which may not form a continuous coating upon the lignocellulosic substrates. The hydrophobizing composition and the one or more resins can be mixed together before applying to the lignocellulosic material or they can be applied separately. The resin, the hydrophobizing composition, and the liquid medium can be applied to the lignocellulosic substrates by one or more spraying, blending or mixing techniques. One technique can be to spray the resin, the hydrophobizing composition and the liquid medium on the wood strands as the strands are tumbled in a drum blender. In one example, the hydrophobizing composition and the liquid medium can be added through a j-nozzle at a temperature of about 60° C. to about 99° C. depending on the melt point of the hydrophobizing agent (e.g., the hydrophobizing agent is added at temperature above its melting point). In one example, the loading level of the hydrophobizing composition and the liquid medium is about 0.5 wt % to about 2.5 wt %.

The resin can include one or more resins commonly used or to be developed in the composite board manufacturing arts as a composite board waterproofing and/or adhesive material. The resin can be a solid, e.g., powder, resin, a liquid resin, or a mixture of solid(s) and liquid(s). Suitable resins can include, but is not limited to, isocyanate resin, urea-formaldehyde (UF) resin, phenol-formaldehyde (PF) resin, melamine-urea-formaldehyde (MUF) resin, melamine-formaldehyde (MF) resin, or melamine-urea-phenol-formaldehyde (MUPF) resin, and any mixture thereof. The resin can be polymeric diphenylmethane diisocyanate "MDI). A suitable MDI resin product can be RUBINATE® 1840, available from Huntsman, Salt Lake City, Utah, and MONDUR® 541 MDI, available from Bayer Corporation, North America, of Pittsburgh, Pa. Suitable commercial MUF binders are the LS 2358 and LS 2250 products from Dynea Corporation, Helsinki, Finland.

The composite product can have a resin content of about 1 wt %, about 1.5 wt %, about 3.5 wt %, about 5.5 wt %, or about 10 wt % to about 15 wt %, about 17 wt %, or about 25 wt %, based on the dry weight of the composite product. In another example, the composite product can have a resin content of about 1.2 wt % to about 2.4 wt %, about 3.2 wt % to about 4.4 wt %, about 5.2 wt % to about 6.7 wt %, about 10.2 wt % to about 14.6 wt %, about 17 wt % to about 20 wt %, or about 22 wt % to about 24 wt %, based on the dry weight of the composite product.

The plurality of layers of wood strands, flakes, chips, particles, or wafers where each layer of wood strands, flakes, chips, particles, or wafers includes strands oriented perpendicularly to the adjacent layers. As used herein, "flakes", "strands", "chips", "particles", and "wafers" are considered equivalent to one another and are used interchangeably. Such wood strands are bonded together by a binder resin and sized by a sizing agent disclosed herein.

Lignocellulosic substrates can be made from a variety of different lignocellulosic materials, such as wood, including naturally occurring hardwood or softwood species, singularly or mixed, and grasses such as bamboo. Strands of lignocellulosic materials are cut, dried, and then coated with the binder resins, mixture of hydrophobizing agent, and other additives. The lignocellulose substrates can include any one or more of the plant and vegetable materials discussed and described above with reference to the source for the lignins and tannins. As used herein, the term "lignocellulose" refers to a material that includes lignin and cellulose, hemicelluose, or a combination of cellulose and hemicelluloses. The starting material, from which the lignocellulose substrates can be or can be derived from, can be shaped, reduced, or otherwise formed to the appropriate dimensions by various processes such as hogging, grinding, hammer milling, tearing, shredding, and/or flaking. Other processes for producing the substrates can include skiving, cutting, slicing, and/or sawing. The lignocellulose substrates can be scrimber, which is wood that has been soaked, crushed, and pulled apart to make the substrates. Suitable forms of the lignocellulose substrates can include, but are not limited to, chips, flakes, wafers, fibers, powder, shavings, sawdust or dust, veneer, strands, and/or the like. Accordingly, the term "substrate" when used in conjunction with "lignocellulose" refers to lignocellulose material or lignocellulose containing material having any desired shape such as chips, flakes, fibers, powder, shavings, sawdust or dust, veneer, strands, and/or the like. Other suitable lignocellulose substrates can include, but are not limited to, wood chips, wood fibers, wood flakes, wood strands, wood wafers, wood shavings, wood particles, wood veneer, or any combination thereof.

The lignocellulose substrates can include liquid on, about, and/or within the substrates. For example, the lignocellulose substrates can have a liquid, e.g., moisture, content of about 1 wt %, about 2 wt %, about 3 wt %, about 4 wt, or about 5 wt % to about 7 wt %, about 9 wt %, about 11 wt %, about 13 wt %, about 15 wt %, about 17 wt %, about 19 wt %, about 21 wt %, about 23 wt %, about 25 wt %, about 27 wt %, about 29 wt %, about 31 wt %, about 33 wt %, about 35 wt %, or about 37 wt %, based on the dry weight of the lignocellulose substrate. In another example, the lignocellulose substrates can have a liquid, e.g., moisture, content of about 1 wt % to about 10 wt %, about 2 wt % to about 4 wt %, about 2 wt % to about 3 wt %, about 3 wt % to about 6 wt %, about 5 wt % to about 10 wt %, about 6 wt % to about 8 wt %, or about 4 wt % to about 9 wt %, based on the dry weight of the lignocellulose substrate. The lignocellulose substrates can be fresh, e.g., not treated or dried, or dried and/or treated. For example, the lignocellulose substrates and/or the starting material from which the lignocellulose substrates were derived can be at least partially dried. In another example, the lignocellulose substrates can be washed and/or leached with an aqueous medium such as water.

The resinated wood mixture can include one or more liquid mediums. The liquid medium can be or include, but is not limited to, water, alcohols, glycols, acetonitrile, dimethyl sulfoxide, N,N-dimethylformamide, N-methylpyrrolidone, or any combination thereof. Suitable alcohols can include, but are not limited to, methanol, ethanol, propanol, isopropanol, butanol, or any combination thereof. Suitable glycols can include, but are not limited to, ethylene glycol, propylene glycol, or a combination thereof. As used herein, the terms "aqueous medium" and "aqueous liquid" can be or include water and/or mixtures composed of water and/or other water-miscible solvents. Illustrative water-miscible solvents can include, but are not limited to, alcohols, ethers, amines, other polar aprotic solvents, and the like.

The resinated wood mixture can have a water content, a moisture content, or a liquid medium content of about 1 wt %, about 3 wt %, about 5 wt %, or about 10 wt % to about 12 wt %, about 14 wt %, about 16 wt %, about 18 wt %, about 20 wt %, about 22 wt %, or about 24 wt %, based on the combined weight lignocellulosic substrates, the resin, and the hydrophobizing agent. For example, when the resinated wood mixture contains water as the liquid, the resinated wood mixture can have a moisture content of about 2 wt % to about 6 wt %, about 4 wt % to about 8 wt %, about 5 wt % to about 9 wt %, about 7 wt % to about 10 wt %, about 8 wt % to about 12 wt %, about 10 wt % to about 15 wt %, or about 14 wt % to about 20 wt %, based on the combined weight lignocellulosic substrates, the resin, and the hydrophobizing composition.

The resinated wood mixture can include a catalyst to aid in curing the resin of the resinated wood mixture. The catalyst can also be referred to as an initiator, a promoter, a reducer, and/or an accelerator. Suitable catalysts can be or include, but are not limited to, acids, bases, and metal catalysts can be used to at least partially cure the binder. Suitable acids can include, but are not limited to, sulfuric acid, maleic acid, lactic acid, acetic acid, formic acid, a urea/phenolsulfonic acid, toluene sulfonic acid, or any combination thereof. Suitable bases can include, but are not limited, sodium hydroxide, ammonium hydroxide, ammonium sulfate, lithium hydroxide, potassium hydroxide, triethylene tetraamine, diethylene triamine, triethylamine, urea, GP® 4590 k-20 precatalyst (commercially available from Georgia-Pacific Chemicals LLC), or any combination thereof. Suitable metal catalysts can include, but are not limited to, salts of lithium, sodium, potassium, aluminum, calcium, magnesium, zinc, or any combination thereof. Other suitable catalysts can include, but are not limited to, sodium nitrate, aluminum sulfate, ammonium hydrogen phosphate, ammonium persulfate, ammonium chloride, ammonium nitrate, ammonium sulfate, or any combination thereof. Suitable metal catalysts can also include transition metals, transition metal salts, transition metal complexes, or any mixture thereof.

The amount of acid, base, or metal catalyst, if present, can widely vary. For example, the amount of catalyst in the mixture can be about 0.00001 wt %, about 0.0001 wt %, about 0.001 wt %, about 0.01 wt %, or about 0.1 wt % to about 0.5 wt %, about 1 wt %, about 3 wt %, about 5 wt %, about 10 wt %, or about 20 wt %, based on the dry weight of the lignocellulose substrates. In another example, the amount of catalyst in the mixture can be about 0.01 wt % to about 1.5 wt %, about 0.1 wt % to about 1.3 wt %, about 0.05 wt % to about 0.5 wt %, about 0.07 wt % to about 0.4 wt %, about 0.05 wt % to about 5 wt %, based on the dry weight of the lignocellulose substrates. In another example, the amount of the catalyst in the mixture can be about 0.001 wt % to about 0.5 wt %, about 0.15 wt % to about 0.35 wt %, about 0.1 wt % to about 0.4 wt %, about 0.1 wt % to about 2 wt %, about 0.05 wt % to about 3 wt %, about 0.05 wt % to about 0.35 wt %, about 0.1 wt % to about 4.5 wt %, about 0.15 wt % to about 4 wt %, about 0.05 wt % to about 3 wt %, or about 0.01 wt % to about 3.5 wt %, based on the dry weight of the lignocellulose substrates.

Illustrative base compounds that can be used to adjust the pH or cure the resinated wood mixture can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, sodium bicarbonate, potassium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO).

Illustrative acid compounds that can be used to adjust the pH or cure the resinated wood mixture can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, or any combination thereof. Illustrative acid salts can include, but are not limited to, ammonium sulfate, sodium bisulfate, sodium metabisulfite, or any combination thereof. The acid compounds can also include latent acids, which are released upon heating or irradiating. Suitable latent acids can include, but are not limited to, one or more amine salts. Suitable amine salts can be the reaction products of one or more amines with one or more acids.

In one or more embodiments, one or more additives can be combined with the resinated wood furnish. Illustrative additives can include, but are not limited to, waxes and/or other hydrophobic additives, water, filler materials, extenders, surfactants, release agents, dyes, fire retardants, formaldehyde scavengers, biocides, or any combination thereof. For composite wood products, such as plywood, filler materials can include, but are not limited to, ground pecan, walnut, and/or other nut shells, and typical extenders can include, for example, wheat flour. Other suitable extenders can include, but are not limited to, polysaccharides, and the like. Illustrative polysaccharides can include, but are not limited to, starch, cellulose, gums, such as guar and xanthan, alginates, pectin, gellan gum, or any combination thereof. Suitable polysaccharide starches can include, for example maize or corn, waxy maize, high amylose maize, potato, tapioca, and wheat starch. Other starches such as genetically engineered starches can include high amylose potato and potato amylopectin starches.

If one or more additives are present in the resinated wood, the amount of each additive can be about 0.01 wt % to about 50 wt %, based on the total weight of the resinated wood furnish. For example, the amount of any given component or additive can be about 0.01 wt %, about 0.05 wt %, about 0.1 wt %, about 0.5 wt %, or about 1 wt % to about 3 wt %, about 5 wt %, about 7 wt %, or about 9 wt %, based on the total weight of the resinated wood furnish. In another example, the amount of any given additive or component can be about 1 wt %, about 5 wt %, about 10 wt %, about 15 wt %, or about 20 wt % to about 25 wt %, about 30 wt %, about 35 wt %, about 40 wt %, or about 45 wt %, based on the total weight of the resinated wood furnish.

The lignocellulose substrates can be continuously or semi-continuously mixed, blended, or otherwise combined with the other components of the resinated wood furnish, e.g., the catalyst, can be introduced to a blender at a first or introduction region, end, area, or other location(s) configured to receive the components and the resinated wood furnish can be withdrawn from the blender via one or more mixture recovery outlets. The blender can be configured to contain anywhere from a few hundred kilograms to several thousand kilograms. For example, in a single blender anywhere of about 500 kg/hr, about 5,000 kg/hr, about 10,000 kg/hr, or about 13,000 kg/hr to about 16,000 kg/hr, about 20,000 kg/hr, about 25,000 kg/hr, or about 30,000 kg/hr of the resinated wood furnish can be recovered from the blender. As the resinated wood furnish exits the blender, the resinated wood furnish can be deposited onto a conveyor belt and can be transported to one or more dryers, moistening systems, presses, and/or other processing equipment. For example, in at least one specific embodiment, a particle board product can be made blending a first or "face" resinated wood furnish and a second or "core" resinated wood furnish in a first and second blend, respectively. The first blender can produce about 13,600 kg/hr to about 15,900 kg/hr of a "face" resinated wood furnish and the second blender can produce about 18,100 kg/hr to about 20,400 kg/hr of a "core" resinated wood furnish. The "face" and "core" resinated wood furnishes can be used to produce a particleboard panel or sheet, where the "face" resinated wood furnish makes up the outer layers of the particleboard and the "core" resinated wood furnish makes up the inner or core layer of the particleboard.

Pressure can optionally be applied to the resinated wood mixture before, during, and/or after the mixture is heated to produce the composite product. For example, if the desired composite product shape or structure is a panel, sheet, board, or the like, an amount of the mixture sufficient to produce a composite product of the desired size, can be transported, directed, placed, introduced, disposed, or otherwise located within a press capable of pressing the mixture before the mixture is heated and/or when the resinated wood mixture is heated. The press can be an open press or a closed press. In at least one specific embodiment, an open press can be used to press the resinated wood mixture when the resinated wood mixture is heated. The resinated wood mixture can also be extruded through a die (e.g., extrusion process) and can be heated to produce the composite product. The press temperature can be about of about 100° C., about 125° C., or about 175° C. to about 275° C., about 35 about 500° C. In another example, the press temperature can be about 160° C. to about 175° C., about 175° C. to about 200° C., about 200° C. to about 225° C., about 220° C. to about 255° C., about 255° C. to about 275° C., or about 275° C. to about 325° C., about 300° C. to about 400° C.

The resinated wood mixture can be heated to a temperature of at least 60° C., at least 70° C., at least 80° C., at least 90° C., at least 110° C., at least 130° C., at least 155° C., at least 200° C., at least 225° C., at least 250° C., at least 275° C., or at least 300° C. The resinated wood mixture can be heated to a temperature of about 60° C., about 90° C., about 120° C., about 150° C., or about 160° C. to about 170° C., about 200° C., about 230° C., about 360° C., or about 500° C. to produce the composite product. The resinated wood mixture can be heated to a temperature of about 140° C. to about 200° C., about 155° C. to about 185° C., about 180° C. to about 210° C., about 200° C. to about 250° C., or about 245° C. to about 500° C.

The resinated wood mixture can be pressed at a pressure of about 0.5 MPa, about 1 MPa, about 3 MPa, or about 5 MPa to about 7 MPa, about 9 MPa, or about 10 MPa. The resinated wood mixture can be pressed at a pressure of about 0.6 MPa to about 0.9 MPa, about 0.7 MPa to about 1.8 MPa, about 1.9 MPa to about 2.9 MPa, about 3.6 MPa to about 4.8 MPa, about 4.6 MPa to about 5.8 MPa, about 6.2 MPa. In another example, the resinated wood mixture can be pressed at a pressure of about 0.6 MPa to about 0.9 MPa, about 0.7 MPa to about 1.8 MPa, about 1.9 MPa to about 2.9 MPa, about 3.6 MPa to about 4.8 MPa, about 4.6 MPa to about 5.8 MPa, about 6.2 MPa to about 7.9 MPa, or about 8.6 MPa to about 9.9 MPa.

The heating of the resinated wood mixture can be determined, at least in part, by the length of the formed composite product. For example, the composite product can be in the form of a panel, sheet, board, or the like, and the amount of time per length of the resinated wood mixture in the form of the composite product can be heated is about 5 seconds per millimeter (s/mm), about 10 s/mm, about 12 s/mm, or about 15 s/mm to about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product. For example, the resinated wood mixture can be heated for about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another example, the mixture can be heated for less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific example, a composite product in the form of a panel, sheet, board, or the like and having an average thickness of about 15 mm and subjected to a total heating time of about 4 minutes would correspond to heating the resinated wood mixture for about 16 s/mm. In another specific example, the resinated wood mixture can be heated to a temperature of about 160° C. to about 170° C. for a time of 13 s/mm to about 19 s/mm.

Lignocellulosic composite products made with the hydrophobizing composition can be used to produce a variety of articles. For example, the composite products can be used as sheathing to form floors, roofs, or walls or in furniture, to name a few. Illustrative composite products discussed and described herein can include, but are not limited to, particleboard, fiberboard such as medium density fiberboard (MDF) and/or high density fiberboard (HDF), plywood such as hardwood plywood and/or softwood plywood, oriented strand board (OSB), laminated veneer lumber (LVL), laminated veneer timber, laminated veneer boards (LVB), parallel stranded lumber (PSL), oriented stranded lumber (OSL), engineered wood flooring, and the like. The parallel stranded lumber can be PARALLAM® lumber made by Weyerhaeuser NR Company. The oriented stranded lumber can be TIMBER STRAND® lumber made by Weyerhaeuser NR Company.

Composite products in the shape or form of a panel, sheet, board, or the like can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

The particular configuration of the substrates can be based, at least in part, on the desired product. For example, particulates such as chips, fibers, shavings, sawdust, or dust, can be used to produce particleboards, fiberboards, and the like. The substrates can have a length of about 0.05 mm, about 0.1 mm, about 0.2 mm to about 1 mm, about 5 mm, about 10 mm, about 20 mm, about 30 mm, about 40 mm, about 50 mm, or about 100 mm. In another example, veneers, e.g., layers or sheets of wood, can be used for producing plywood, laminated veneer lumber, and the like. The veneers can have a thickness of about 0.8 mm, about 0.9 mm, about 1 mm, about 1.1 mm, or about 1.2 mm to about 3 mm, about 4 mm, about 5 mm, about 6 mm, about 7 mm, about 8 mm, about 9 mm, or about 10 mm.

Composite products such as particleboard, fiberboard, plywood, and oriented strand board, can have a thickness or average thickness of about 1.5 mm, about 5 mm, or about 10 mm to about 15 mm, about 20 mm, about 25 mm, about 30 mm, about 50 mm, about 100 mm, about 200 mm, or about 490 mm. Composite products can have a length of about 0.1 m, about 0.5 m, about 1 m, about 1.2 m to about 2 m, about 2.4 m, about 3 m, or about 3.6 m. The composite products can also have a width of about 0.1 m, about 0.5 m, or about 1 m to about 1.8 m, about 2.4 m, or about 3 m.

The composite product can have a density of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, or about 1 g/cm$^3$. For example, the composite product can have a density of about 0.7 g/cm$^3$ to about 0.75 g/cm$^3$, about 0.65 g/cm$^3$ to about 0.85 g/cm$^3$, about 0.65 g/cm$^3$ to about 0.8 g/cm$^3$, about 0.67 g/cm$^3$ to about 0.77 g/cm$^3$, about 0.5 g/cm$^3$ to about 1 g/cm$^3$, about 0.5 g/cm$^3$ to about 0.8 g/cm$^3$, about 0.5 g/cm$^3$ to about 0.75 g/cm$^3$, or about 0.64 g/cm$^3$ to about 0.8 g/cm$^3$. In one or more embodiments, the composite product can have a density of less than 1 g/cm$^3$, less than 0.95 g/cm$^3$, less than 0.88 g/cm$^3$, less than 0.85 g/cm$^3$, less than 0.83 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$.

The composite product can have an internal bond strength of about 0.3 MPa, about 0.32 MPa, about 0.34 MPa, about 0.35 MPa, about 0.37 MPa, about 0.4 MPa, about 0.42 MPa, about 0.48 MPa, about 0.52 MPa, about 0.55 MPa, or about 0.58 MPa to about 0.69 MPa, about 0.75 MPa, about 0.83 MPa, about 0.9 MPa, about 0.97 MPa, about 1.05 MPa, about 1.15 MPa, about 1.2 MPa, about 1.25 MPa, about 1.3 MPa, about 1.35 MPa, about 1.4 MPa, about 1.45 MPa, about 1.5 MPa, about 1.55 MPa, about 1.6 MPa, or about 2 MPa. For example, the composite product can have an internal bond strength of about 0.35 MPa to about 0.55 MPa, about 0.4 MPa to about 0.6 MPa, about 0.48 MPa to about 0.69 MPa, about 0.59 MPa to about 0.86 MPa, about 0.55 MPa to about 0.9 MPa, or about 0.51 MPa to about 0.85 MPa. In one or more embodiments, the composite product can have an internal bond strength of at least 0.33 MPa, at least 0.32 MPa, at least 0.34 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.66 MPa, at least 0.69 MPa, at least 0.72 MPa, at least 0.76 MPa, or at least 1.4 MPa. The internal bond strength can be determined according to ASTM D1037 Sec. 100 Method B.

The composite product can have a thickness swell of at least 2%, at least 5%, at least 8%, at least 15%. In other examples, the composite product can have a thickness swell of less than 50%, less than 40%, less than 30%, less than 20%, or less than 10%. The composite product can have a thickness swell of about 0%, about 5%, about 10% to about 30%, about 40%, about 50%. For example the composite product can have a thickness swell of about 3% to about 12%, about 11% to about 16%, about 13% to about 20%, about 19% to about 32%, about 29% to about 42%, or about 35% to about 47%. The thickness swell can be determined according ASTM D1037-06a.

The composite product can have a water absorption of less than 75 wt %, less than 50 wt %, less than 30 wt %, less than 20 wt %, or less than 10 wt %, based on the total weight of the composite product. The composite product can have a water absorption of about 0 wt %, about 15 wt %, about 30 wt % to about 55 wt %, about 65 wt %, about 75 wt %, based on the total weight of the composite product. For example the composite product can have a water absorption of about 3 wt % to about 12 wt %, about 11 wt % to about 16 wt %, about 13 wt % to about 20 wt %, about 19 wt % to about 32 wt %, about 29 wt % to about 42 wt %, or about 35 wt % to about 47 wt %, based on the total weight of the composite product. The water absorption can be determined according to ASTM D1037-06a.

Referring to particleboard in particular, particleboard made according to one or more embodiments discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more embodiments discussed and described herein can meet or exceed the requirements for PBU, D-2, D-3, and/or M-3 as defined by the ANSI for particleboard, i.e., ANSI A208.1-2009 Particleboard, approved Feb. 2, 2009. Referring to OSB in particular, OSB made according to one or more embodiments discussed and described herein can meet or exceed the U.S. Department of Commerce Voluntary Performance Standard PS 2. Referring to plywood in particular, plywood made according to one or more embodiments discussed and described herein can meet or exceed the U.S. Department of Commerce Voluntary Performance Standard PS 1 and/or PS-2.

If one or more additives are present in the resinated wood mixture, the amount of each additive can be about 0.01 wt % to about 50 wt %, based on the total weight of the resinated wood mixture. For example, the amount of any given component or additive can be about 0.01 wt %, about 0.05 wt %, about 0.1 wt %, about 0.5 wt %, or about 1 wt % to about 3 wt %, about 5 wt %, about 7 wt %, or about 9 wt %, based on the total weight of the resinated wood mixture. In another example, the amount of any given additive or component can be about 1 wt %, about 5 wt %, about 10 wt %, about 15 wt %, or about 20 wt % to about 25 wt %, about 30 wt %, about 35 wt %, about 40 wt %, or about 45 wt %, based on the total weight of the resinated wood mixture.

The resinated wood mixture discussed and described herein can be free or essentially free of formaldehyde for use in the production of the composite products, e.g., wood products such as particleboard and plywood. As used herein, the term "essentially free of formaldehyde" means the mixture does not include or contain any intentionally added formaldehyde or compounds that can decompose, react, or otherwise form formaldehyde. Said another way, the term "essentially free of formaldehyde" means the mixture does not contain formaldehyde or compounds that can form formaldehyde, but may include formaldehyde present as an impurity. Accordingly, depending on the particular multifunctional aldehyde(s) used to produce the mixtures discussed and described herein, the mixture can be referred to as "no added formaldehyde" or "NAF" mixture.

The composite products discussed and described herein can exhibit a low level of formaldehyde emission. A suitable test for determining formaldehyde emission from a composite product can include ASTM D6007-02 and ASTM E1333-10. For example, the composite products can exhibit a formaldehyde emission of zero. In another example, the composite products can exhibit a formaldehyde emission of less than 1 part per million (ppm), less than 0.09 ppm, less than 0.08 ppm, less than 0.07 ppm, less than 0.06 ppm, less than 0.05 ppm, less than 0.04 ppm, less than 0.03 ppm, less than 0.02 ppm, less than 0.01 ppm, or less than 0.005 ppm.

The composite product can meet or exceed the formaldehyde emission standards required by the California Air Resources Board (CARB) Phase 1 (less than 0.1 parts per million "ppm" formaldehyde for particleboard), and Phase 2 (less than 0.09 ppm formaldehyde for particleboard). The composite products discussed and described herein can also meet or exceed the formaldehyde emission standards required by the Japanese JIS/JAS F* (does not exceed 0.5 mg/L formaldehyde for particleboard), Japanese JIS/JAS F** (does not exceed 0.3 mg/L formaldehyde for particleboard), European E1, and European E2 standards.

Embodiments of the present disclosure further relate to any one or more of the following paragraphs:

1. A method for making an emulsified hydrophobizing composition, comprising: mixing a hydrophobizing agent, a liquid medium, and a lignosulfonic acid or salt thereof to provide a hydrophobizing composition; emulsifying the hydrophobizing composition using hydrodynamic cavitation to provide an emulsified hydrophobizing composition, wherein the emulsified hydrophobizing composition has an average particle size of about 0.3 microns to about 160 microns; and maintaining the emulsified hydrophobizing composition at a temperature of greater than a melting point of the hydrophobizing agent for at least 10 minutes.

2. The method according to paragraph 1, wherein the melting point of the hydrophobizing agent is about 60° C. to about 90° C.

3. The method according to paragraph 1 or 2, wherein the emulsified hydrophobizing composition is maintained at a temperature of greater than the melting point of the hydrophobizing agent for at least 20 minutes.

4. The method according to any one of paragraphs 1 to 3, wherein the emulsified hydrophobizing composition is maintained at a temperature of greater than the melting point of the hydrophobizing agent for about 10 minutes to about 30 minutes.

5. The method according to any one of paragraphs 1 to 4, wherein the emulsified hydrophobizing composition has an average a particle size of about 0.3 microns to about 2 microns.

6. The method according to any one of paragraphs 1 to 5, wherein the hydrophobizing composition further comprises one or more surfactants, and wherein the surfactant comprises cationic surfactants, non-ionic surfactants, anionic surfactants, zwitterionic surfactants, amphoteric surfactants, starch-based surfactants, and soap-based surfactants, or any mixture thereof.

7. A method for making an emulsified hydrophobizing composition, comprising: mixing a hydrophobizing agent, a liquid medium, and a lignosulfonic acid or salt thereof to provide a hydrophobizing composition; emulsifying the hydrophobizing composition using hydrodynamic cavitation to provide an emulsified hydrophobizing composition, wherein the emulsified hydrophobizing composition has an average particle size of about 0.3 microns to about 160 microns; and maintaining the emulsified hydrophobizing composition at a temperature of greater than 25° C. for at least 20 minutes.

8. The method according to paragraph 7, wherein the emulsified hydrophobizing composition is maintained at a temperature of greater than 25° C. for at least 30 minutes.

9. The method according to paragraph 7 or 8, wherein the emulsified hydrophobizing composition is maintained at a temperature of greater than 50° C. for about 20 minutes to about 40 minutes.

10. The method according to any one of paragraphs 7 to 9, wherein the emulsified hydrophobizing composition is maintained at a temperature of greater than 50° C. for about 60 minutes to about 120 minutes.

11. The method according to any one of paragraphs 7 to 10, wherein the emulsified hydrophobizing composition is maintained at a temperature of greater than 60° C. for at least 20 minutes.

12. The method according to any one of paragraphs 7 to 11, wherein the emulsified hydrophobizing composition is maintained at a temperature of greater than 60° C. for about 60 minutes to about 120 minutes.

13. The method according to any one of paragraphs 7 to 12, wherein the emulsified hydrophobizing composition has an average a particle size of about 0.3 microns to about 2 microns.

14. The method according to any one of paragraphs 7 to 13, wherein the emulsified hydrophobizing composition has an average a particle size of about 0.2 microns to about 0.7 microns.

15. A method for making a composite product, comprising: contacting a plurality of lignocellulosic substrates with a resin and an emulsified hydrophobizing composition to form a resinated wood mixture, wherein the emulsified hydrophobizing composition is made by: mixing a hydrophobizing agent, a liquid medium, and a lignosulfonic acid or salt thereof to provide a hydrophobizing composition; emulsifying hydrophobizing composition using hydrodynamic cavitation to provide an emulsified hydrophobizing composition, wherein the emulsified hydrophobizing composition has an average particle size of about 0.3 microns to about 160 microns; and maintaining the emulsified hydrophobizing composition at a temperature of greater than 25° C. for at least 20 minutes; and at least partially curing the resinated wood mixture to produce a composite product.

16. The method according to paragraph 15, wherein the emulsified hydrophobizing composition is maintained at a temperature of greater than 50° C. for about 20 minutes to about 40 minutes.

17. The method according to paragraph 15 or 16, wherein the emulsified hydrophobizing composition is maintained at a temperature of greater than 50° C. of the hydrophobizing agent for about 60 minutes to about 120 minutes.

18. The method according to paragraph 15 or 17, wherein the emulsified hydrophobizing composition is maintained at a temperature of greater than 60° C. of the hydrophobizing agent for at least 20 minutes.

19. The method according to paragraph 15 or 18, wherein the emulsified hydrophobizing composition is maintained at a temperature of greater than 60° C. of the hydrophobizing agent for about 60 minutes to about 120 minutes.

20. The method according to paragraph 15 or 19, wherein the composite product has an internal bond strength of about 0.35 MPa to about 1.35 MPa, as determined according to the test procedure provided for in ASTM D1037-06a.

21. The method according to any one of paragraphs 1 to 6, wherein the temperature is about 60° C. to about 95° C.

22. The method according to any one of paragraphs 1 to 6, wherein the temperature is at least 60° C. to about 99° C.

23. The method according to any one of paragraphs 1 to 6, wherein the temperature is at least 60° C. and less than 95° C.

24. The method according to any one of paragraphs 7 to 14, wherein the temperature is about 60° C. to about 95° C.

25. The method according to any one of paragraphs 7 to 14, wherein the temperature is at least 60° C. to about 99° C.

26. The method according to any one of paragraphs 7 to 14, wherein the temperature is at least 60° C. and less than 95° C.

27. The method according to any one of paragraphs 15 to 20, wherein the temperature is about 60° C. to about 95° C.

28. The method according to any one of paragraphs 15 to 20, wherein the temperature is at least 60° C. to about 99° C.

29. The method according to any one of paragraphs 15 to 20, wherein the temperature is at least 60° C. and less than 95° C.

30. The method according to any one of paragraphs 1 to 29, wherein the hydrophobizing agent comprises one or more waxes.

31. The method according to any one of paragraphs 1 to 29, wherein the hydrophobizing agent comprises one or more petroleum waxes, one or more montan waxes, one or more vegetable waxes, one or more vegetable oils, or any mixture thereof.

32. The method according to any one of paragraphs 1 to 31, wherein the liquid medium comprises water, one or more alcohols, one or more ethers, or any mixture thereof.

33. The method according to any one of paragraphs 1 to 31, wherein the liquid medium comprises water, methanol, ethanol, propanol, iso-propanol, n-butanol, sec-butanol, iso-butanol, tert-butanol, ethylene glycol, dimethyl ether, diethyl ether, tetrahydrofuran, or any mixture thereof.

34. The method according to any one of paragraphs 1 to 33, wherein the lignosulfonic acid or salt thereof comprises ammonium lignosulfonate, alkyl ammonium lignosulfonate, hydroxyalkyl ammonium lignosulfonate, lithium lignosulfonate, sodium lignosulfonate, potassium lignosulfonate, calcium lignosulfonate, magnesium lignosulfonate, or any mixture thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a composite product, comprising:
   contacting a plurality of lignocellulosic substrates with a resin and an emulsified hydrophobizing composition to form a resinated wood mixture, wherein the emulsified hydrophobizing composition is made by:
   mixing one or more hydrophobizing agents, one or more liquid mediums, and one or more lignosulfonic acids or salts thereof to provide a hydrophobizing composition, wherein the hydrophobizing composition comprises 9 wt % to about 15 wt % of the one or more lignosulfonic acids or salts thereof, based on a total weight of all hydrophobizing agents, all liquid mediums, and all lignosulfonic acids or salts thereof that are in the hydrophobizing composition;
   emulsifying the hydrophobizing composition using hydrodynamic cavitation to provide an emulsified hydrophobizing composition, wherein the emulsified hydrophobizing composition has an average particle size of about 0.3 microns to about 160 microns; and
   maintaining the emulsified hydrophobizing composition at a temperature of greater than 25° C. for at least 20 minutes; and
   at least partially curing the resinated wood mixture to produce a composite product.

2. The method of claim 1, wherein the composite product has an internal bond strength of about 0.35 MPa to about 1.35 MPa, as determined according to the test procedure provided for in ASTM D1037-06a.

3. The method of claim 1, wherein the hydrophobizing composition comprises about 0.5 wt % to about 30 wt % of the one or more hydrophobizing agents, based on the total weight of all hydrophobizing agents, all liquid mediums, and all lignosulfonic acids or salts thereof that are in the hydrophobizing composition.

4. The method of claim 1, wherein the one or more hydrophobizing agents comprise a vegetable wax, a vegetable oil, or a mixture thereof.

5. The method of claim 1, wherein the one or more hydrophobizing agents comprise a vegetable wax, and wherein the vegetable wax comprises carnauba wax, bayberry wax, candelilla wax, castor wax, esparto wax, ouricury wax, rice bran wax, soy wax, or any mixture thereof.

6. The method of claim 1, wherein the one or more hydrophobizing agents comprise a vegetable oil.

7. The method of claim 1, wherein the one or more hydrophobizing agents comprise paraffin wax, slack wax, or a mixture thereof.

8. The method of claim 1, wherein the emulsified hydrophobizing composition further comprises about 1.6 wt % to about 6 wt % of one or more inorganic bases, based on a total weight of all hydrophobizing agents, all liquid mediums, all lignosulfonic acids or salts thereof, and inorganic bases that are in the emulsified hydrophobizing composition.

9. The method of claim 8, wherein the one or more inorganic bases comprise potassium hydroxide, sodium hydroxide, calcium hydroxide, magnesium hydroxide, or any mixture thereof.

10. The method of claim 1, wherein the one or more liquid mediums comprise methanol, ethanol, propanol, iso-propanol, n-butanol, sec-butanol, iso-butanol, tert-butanol, ethylene glycol, dimethyl ether, diethyl ether, tetrahydrofuran, or any mixture thereof.

11. The method of claim 1, wherein the emulsified hydrophobizing composition further comprises about 0.1 wt % to about 10 wt % of one or more surfactants, based on the total weight of all hydrophobizing agents, all liquid mediums, and the one or more all lignosulfonic acids or salts thereof that are in the emulsified hydrophobizing composition.

12. The method of claim 11, wherein the one or more surfactants comprise a cationic surfactant, a non-ionic surfactant, an anionic surfactant, or any mixture thereof.

13. The method of claim 1, wherein the one or more lignosulfonic acids or salts thereof comprise ammonium lignosulfonate, lithium lignosulfonate, sodium lignosulfonate, potassium lignosulfonate, calcium lignosulfonate, magnesium lignosulfonate, or any mixture thereof.

14. The method of claim 1, wherein:
the one or more hydrophobizing agents comprise a vegetable wax, a vegetable oil, or a mixture thereof,
the one or more liquid mediums comprise methanol, ethanol, propanol, iso-propanol, n-butanol, sec-butanol, iso-butanol, tert-butanol, ethylene glycol, dimethyl ether, diethyl ether, tetrahydrofuran, or any mixture thereof,
the one or more lignosulfonic acids or salts thereof comprise ammonium lignosulfonate, lithium lignosulfonate, sodium lignosulfonate, potassium lignosulfonate, calcium lignosulfonate, magnesium lignosulfonate, or any mixture thereof, and
the resin comprises an isocyanate resin, a urea-formaldehyde resin, a phenol-formaldehyde resin, a melamine-urea-formaldehyde resin, a melamine-formaldehyde resin, melamine-urea-phenol-formaldehyde resin, or any mixture thereof.

15. A method for making a composite product, comprising:
contacting a plurality of lignocellulosic substrates with a resin and an emulsified hydrophobizing composition to form a resinated mixture, wherein the emulsified hydrophobizing composition comprises about 0.5 wt % to about 30 wt % of one or more hydrophobizing agents, one or more liquid mediums, and about 0.1 wt % to about 15 wt % of one or more lignosulfonic acids or salts thereof, based on a total weight of all hydrophobizing agents, all liquid mediums, and all lignosulfonic acids or salts thereof that are in the emulsified hydrophobizing composition; and
at least partially curing the resinated mixture to produce a composite product.

16. The method of claim 15, wherein:
the one or more hydrophobizing agents comprise a petroleum wax, montan wax, a vegetable wax, a vegetable oil, or any mixture thereof,
the one or more liquid mediums comprise methanol, ethanol, propanol, iso-propanol, n-butanol, sec-butanol, iso-butanol, tert-butanol, ethylene glycol, dimethyl ether, diethyl ether, tetrahydrofuran, or any mixture thereof,
the one or more lignosulfonic acids or salts thereof comprise ammonium lignosulfonate, lithium lignosulfonate, sodium lignosulfonate, potassium lignosulfonate, calcium lignosulfonate, magnesium lignosulfonate, or any mixture thereof, and
the resin comprises an isocyanate resin, a urea-formaldehyde resin, a phenol-formaldehyde resin, a melamine-urea-formaldehyde resin, a melamine-formaldehyde resin, melamine-urea-phenol-formaldehyde resin, or any mixture thereof.

17. The method of claim 16, wherein the emulsified hydrophobizing composition comprises 9 wt % to about 15 wt % of the one or more lignosulfonic acids or salts thereof, based on the total weight of all hydrophobizing agents, all liquid mediums, and all lignosulfonic acids or salts thereof that are in the emulsified hydrophobizing composition.

18. A method for making a composite product, comprising:
mixing one or more hydrophobizing agents, one or more liquid mediums, and one or more lignosulfonic acids or salts thereof to provide a hydrophobizing composition, wherein the hydrophobizing composition comprises 9 wt % to about 15 wt % of the one or more lignosulfonic acids or salts thereof, based on a total weight of all hydrophobizing agents, all liquid mediums, and all lignosulfonic acids or salts thereof that are in the hydrophobizing composition;
emulsifying the hydrophobizing composition using hydrodynamic cavitation to provide an emulsified hydrophobizing composition;
maintaining the emulsified hydrophobizing composition at a temperature of greater than 25° C. for at least 20 minutes;
contacting a plurality of lignocellulosic substrates with the emulsified hydrophobizing composition and a resin to provide a resinated mixture; and
at least partially curing the resinated mixture to produce a composite product.

19. The method of claim 18, wherein the emulsified hydrophobizing composition is maintained at a temperature of greater than 60° C. for at least 20 minutes to about 120 minutes.

20. The method of claim 18, wherein:
the one or more hydrophobizing agents comprise a petroleum wax, montan wax, a vegetable wax, a vegetable oil, or any mixture thereof,
the one or more liquid mediums comprise methanol, ethanol, propanol, iso-propanol, n-butanol, sec-butanol, iso-butanol, tert-butanol, ethylene glycol, dimethyl ether, diethyl ether, tetrahydrofuran, or any mixture thereof,
the one or more lignosulfonic acids or salts thereof comprise ammonium lignosulfonate, lithium lignosulfonate, sodium lignosulfonate, potassium lignosulfonate, calcium lignosulfonate, magnesium lignosulfonate, or any mixture thereof, and the resin comprises an isocyanate resin, a urea-formaldehyde resin, a phenol-formaldehyde resin, a melamine-urea-formaldehyde resin, a melamine-formaldehyde resin, melamine-urea-phenol-formaldehyde resin, or any mixture thereof.

* * * * *